United States Patent [19]

Lowton et al.

[11] Patent Number: 5,164,272
[45] Date of Patent: Nov. 17, 1992

[54] ALKALI METAL CELL

[75] Inventors: Ronald P. Lowton, Cinammon Brow; Ian M. Lewis, Widnes; Alan Sykes, Lymm; Michael F. Stackpool, Runcorn, all of Great Britain

[73] Assignee: Chloride Silent Power Limited, Runcorn, England

[21] Appl. No.: 488,025

[22] PCT Filed: Dec. 2, 1988

[86] PCT No.: PCT/GB88/C1075
§ 371 Date: Jun. 28, 1990
§ 102(e) Date: Jun. 28, 1990

[87] PCT Pub. No.: WO89/05527
PCT Pub. Date: Jun. 15, 1989

[30] Foreign Application Priority Data

Dec. 3, 1987 [GB] United Kingdom ............... 8728301

[51] Int. Cl.5 .......................................... H01M 10/39
[52] U.S. Cl. .................................................. 429/104
[58] Field of Search ............... 429/104, 112, 185, 191, 429/102

[56] References Cited

U.S. PATENT DOCUMENTS

| 4,006,281 | 2/1977 | Markin et al. ............ 429/104 X |
| 4,204,035 | 5/1980 | King ........................... 429/104 |
| 4,452,871 | 6/1984 | Bindin ......................... 429/104 |
| 4,510,217 | 4/1985 | Kagawa et al. ............. 429/104 |
| 4,656,102 | 4/1987 | Hasenauer et al. ........ 429/104 |
| 4,759,999 | 7/1988 | Maclachlan et al. ...... 429/104 |

FOREIGN PATENT DOCUMENTS

| 30166605 | 1/1986 | European Pat. Off. . |
| 2279226 | 2/1976 | France . |
| 2568413 | 1/1986 | France . |
| 1461071 | 1/1977 | United Kingdom . |
| 1517287 | 7/1978 | United Kingdom . |
| 1519451 | 7/1978 | United Kingdom . |
| 2127615 | 4/1984 | United Kingdom . |
| 2162680 | 2/1986 | United Kingdom . |
| 2161017 | 4/1986 | United Kingdom . |

OTHER PUBLICATIONS

Patent Abstracts of Japan, vol. 8, No. 181 (E-261) (1618), Aug. 21, 1984, corresponding to Japanese Patent No. JP-A-5973863 (Yuasa Denchi K.K.), Apr. 26, 1984.

Patent Abstracts of Japan, vol. 11, No. 231 (E-527) (2678), Jul. 28, 1987, corresponding to Japanese Patent No. JP-A-6247974 (Hitachi Ltd.) Mar. 2, 1987.

Primary Examiner—Anthony Skapars
Attorney, Agent, or Firm—Finnegan, Henderson, Farabow, Garrett & Dunner

[57] ABSTRACT

Alkali metal cell having a gas tight seat to the safety reservoir of the cell so that an overpressure can be applied to force sodium through a hole in the base of the region around the reservoir.

8 Claims, 3 Drawing Sheets

ALKALI METAL CELL

FIELD OF THE INVENTION

The present invention is concerned with alkali metal cells of the kind comprising an outer container with a solid electrolyte member dividing the interior of the container into anodic and cathodic regions. The anodic region will contain a molten alkali metal, typically sodium, and the cathodic region will contain a suitable cathodic reactant also in liquid state, typically sulphur and sodium polysulphides.

DESCRIPTION OF THE PRIOR ART

It is known to form such alkali metal cells with the solid electrolyte member shaped as a cup located inside the outer container, and with the alkali metal forming the anode contained within the electrolyte cup and the cathodic reactant contained in the outer region between the cup and the outer container. The outer container is typically made of metal and forms a current collector for the cathode. Current may be collected from the alkali metal anode within the electrolyte cup by an electronically conductive current collecting member located within the cup so as normally to be in contact with any alkali metal remaining in the cup, and extending out through a closure member for the electrolyte cup so as to provide a current lead-out.

An example of such an alkali metal cell, taking the form of a sodium/sulphur cell is illustrated in GB-A-2161017.

It is also know to improve the performance of alkali metal cells by providing within the electrolyte cup or tube containing the alkali metal anode, an additional metal foil tubular form immediately adjacent the inner surface of the electrolyte tube. This foil tubular form can be made from a sheet of spring foil rolled into the tube before insertion into the electrolyte cup, whereupon the resilience of the foil tends to press the foil against the cylindrical inner face of the electrolyte.

The purpose of such an inner foil tubular form is to encourage the molten alkali metal to wet a maximum area of the internal cylindrical surface of the electrolyte. It may be appreciated that as the cell discharges, the quantity of alkali metal, typically sodium, within the electrolyte cup or tube declines which can result in a reducing surface area of the electrolyte being in direct contact with the alkali metal. This has hitherto resulted in the internal resistance of cells increasing as they become discharged. However, the metal foil tubular form located within the electrolyte cup or tube causes liquid alkali metal to be drawn up by capillary action in the narrow gap between the foil and the inner cylindrical face of the tube, thereby increasing the surface area of the electrolyte which is wetted and maintaining internal cell resistance at a low level. An example of the above arrangement is disclosed in GB-A-1461071.

The solid electrolyte employed in alkali metal cells is typically made of a ceramic material which though electronically insulating is conductive to cations of the alkali metal. Beta alumina is the usual material for sodium sulphur cells. An additional problem which arises with such cells employing ceramic electrolytes is the possibility of the electrolyte failing, e.g. cracking, and so allowing direct contact and mixing of the anodic and cathodic materials. Any direct mixing results in a highly exothermic reaction which, if not checked, can result in the temperature of the cell rising so high that the outer cell container is breached. This in turn can result in the highly corrosive reaction products leaking into the battery cavity containing the cells.

Whilst substantial effort is directed to the preparation of electrolyte members which have a very high integrity, thereby reducing the risk of a damaging failure of the cell to a very low level, some risk may still remain and efforts have been directed at substantially eliminating this remaining risk of catastrophic failure.

As one example, GB-A-1517287 describes a sodium sulphur cell having a molybdenum tube located inside a tubular solid electrolyte to act as a sodium reservoir. The molybdenum tube defines with the electrolyte a shallow wicking space through which the sodium flows by capillary action. A small hole at the otherwise closed end of the molybdenum tube allows sodium to enter the wicking space from the reservoir and the hole is dimensional to permit a rate of flow of sodium adequate to meet the designed discharge and charge requirements of the cell. However, all such arrangements leave problems in filling the cell, particularly the anode region and alkali metal reservoir, and in closing and sealing the anode region and reservoir.

STATEMENT OF THE INVENTION

According to the present invention, an alkali metal cell comprises an outer container, a solid electrolyte cup within the container dividing the container into an anode region inside the cup and a cathode region outside the cup, and an alkali metal reservoir fitting closely inside the electrolyte cup to provide an active region, so as to limit the amount of the alkali metal directly exposed to the inner surface of the electrolyte cup, the reservoir comprising flow mean sallowing alkali metal to flow from within the reservoir to the active region, and is characterised in having an electrically insulating ceramic closure sealed to the electrolyte cup and having an aperture therein, and in having means adapted to allow, during construction, the application of an overpressure to the interior of the reservoir, the means comprising a gas tight seal between the reservoir and the ceramic closure to enable gas tight communication with the interior of the reservoir through the aperture in the closure. By enabling gas tight communication with the closure, filling the cell with molten alkali metal is greatly facilitated. During filling of the reservoir with the molten alkali metal, or when this is completed, an over pressure can be produced inside the reservoir, to force alkali metal through the flow means to fill, and fully wet the surfaces of, the active region between the electrolyte cup and the reservoir. If no such over pressure is produced in the reservoir the surfaces of the active region, particularly the exposed surface of the solid electrolyte, will not readily by wetted with molten alkali metal, inhibiting the capillary action desirable for drawing alkali metal through the flow means from the reservoir.

In one embodiment, an opening of the reservoir has a wall extending under the ceramic closure having an opening therein aligned with the aperture of the closure. The gas tight seal mean then comprise a means providing a gas tight connection extending from the opening at least into the aperture in the closure. Conveniently, the means providing the gas tight connection may be a filling tube. The term filling tube used herein is not limited to tubes of cylindrical shape or circular cross section, but to any means allowing the through passage of material. There may also be provided a fibre wick in the active region allowing alkali metal to be drawn through the flow means for the reservoir by capillary action. In another embodiment, the dimension of the reservoir may be chosen to provide a active region sufficiently narrow to draw up alkali metal by capillary action. The filling tube may be electrically conducting and electrically interconnected so as to form a current collector for the anode of the cell.

In another embodiment, the filling tube extends only part way through the aperture in the ceramic closure and is sealed therein. Then, the cell may include an anode current collector pin extending through the said aperture and the filling tube to contact molten alkali metal contained in the reservoir. Preferably, in such an embodiment the filling tube is a deformable metal ferrule rivet. Alternatively, both the tube and the reservoir may be electrically conducting and electrically interconnected, and the cell may include an electrically conductive connection stud extending through the aperture and electrically connected to the tube. This stud may have an inner end incorporating a capsule containing a heat expansible material to expand the inner end to form a pressure contact with the filling tube. The reservoir and the filling tube may be metallic.

The assembly comprising the rigidly interconnected filling tube and reservoir may, in the former embodiment, be used to mutually locate the electrolyte cup and the insulating ceramic closure for these two to be sealed together. The reservoir fits closely inside the electrolyte cup, and the filling tube extends through and locates the insulating ceramic closure, so that the cup and closure are held in appropriate positions for sealing together, e.g. by glazing. Since the firing process used to make the electrolyte cups does not produce precisely reproducible dimensions for the cups, it has been necessary to machine the outer periphery of each electrolyte cup near its open end for self-jigging with a closure. The electrolyte material is hard and brittle, so that machining is difficult and expensive. With the arrangement described, this machining can be avoided.

In a further aspect the invention provides a method of making an alkali metal cell of the type having an outer container, a solid electrolyte cup within the container dividing the container into an anode region inside the cup and a cathode region outside the cup, and, bonded around the lip of the cup, an electrically insulating ceramic closure having an aperture therein, and further having an alkali metal reservoir fitted inside the electrolyte cup to form an active region between the electrolyte cup and the reservoir with flow means allowing metal to flow from within the reservoir to the active region, the method including the steps of providing a gas tight connection to the interior of the reservoir through the aperture in the insulating ceramic member, introducing molten alkali metal into the reservoir through said connection, providing an overpressure within the reservoir to force molten alkali metal through the flow means in the reservoir to fill and fully wet said active region and subsequently sealing off the anode region.

Conveniently, the reservoir is sealed to the ceramic member by the gas tight connection before introducing the alkali metal. Additionally, the overpressure may be provided by evacuating the anode region before introducing the alkali metal and then repressurising the interior of the reservoir.

BRIEF DESCRIPTION OF THE DRAWINGS

Examples of the invention will now be described with reference to the accompanying drawings in which.

DETAILED DESCRIPTION

Figure 1:
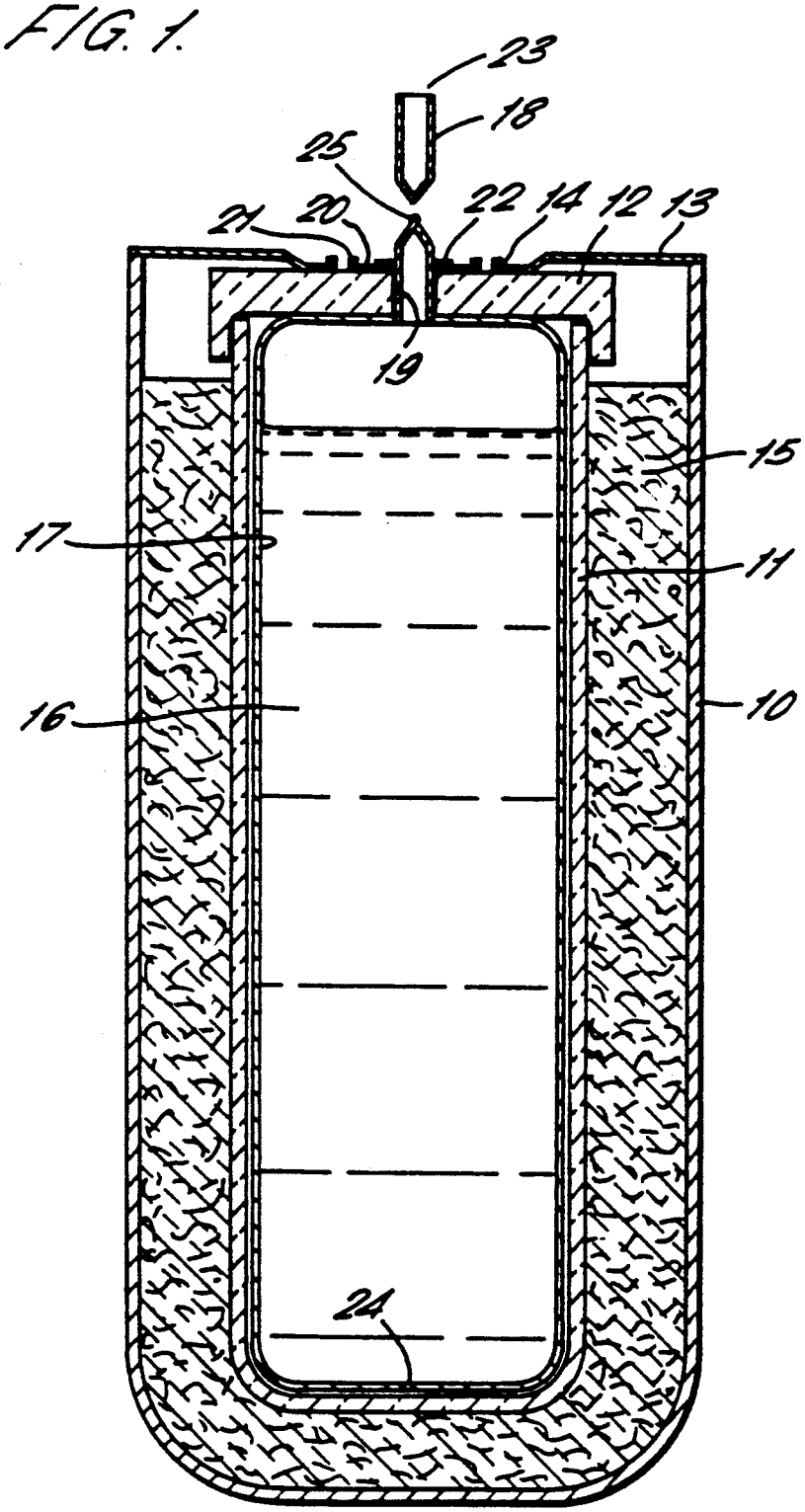
FIG. 1 is a cross-sectional view of a sodium sulphur cell embodying the present invention.

Referring to FIG. 1, the sodium sulphur cell has a generally cylindrical shape and is illustrated in the drawing with the cylindrical axis vertical. The cell has an outer container 10 of metal, typically mild steel internally coated to make it resistant to the cathodic reactant of the cell, sulphur/sodium polysulphide. The cell incorporates an inner tube 11 of beta alumina forming the electrolyte cup. The electrolyte cup 11 is closed at the upper end by a cap 12 of insulating material, typically alpha alumina. The cap 12 is sealed to the electrolyte cup 11 by glazing. A cathode seal 13 is formed of an annular metal foil element, typically of Fecralloy or Inconel which are resistant to attack by the cathodic reactant materials in the cathode region, between the electrolyte 11 and the container 10. The outer periphery of the seal 13 is welded to the open end of the container 10 and the inner edge is sealed to the upper surface of the lid 12 by thermo-compression bonding at 14.

The annular space 15 defining the cathode region of the cell is filled with an electrically conducting felt impregnated, in the fully charged cell, with sulphur which is liquid at the operating temperature of the cell, about 350° C.

The inside of the electrolyte cup 11 forms an anode region 16 and, in this embodiment of the invention, contains a reservoir 17 which may be made of mild steel. The reservoir 17 is of generally cylindrical shape sized to fit snugly within the cup 11 leaving only a narrow space or active region between the reservoir 17 and the inner faces of the cup 11 sufficient to cause a film of molten sodium to be drawn up to fill this narrow space by capillary attraction.

A filling tube 18 is welded in an aperture at the upper end of the reservoir 17 to form a gas tight seal therewith and extends through a hole 19 provided through the lid 12.

The anode region of the cell is sealed by an annular foil member 20, also of Fecralloy or Inconel, which is thermocompression bonded at 21 to the lid 12 just inside but spaced from the sealing point 14 of the cathode region seal 13. A metal washer 22 is welded to the upper face of the annular member 20 and is in turn welded around its inner periphery to the portion of the filling tube 18 extending out through the lid 12.

When assembling the cell, the filling tube 18 is welded to the reservoir 17. Then the reservoir is fitted in the electrolyte cup 11 and the cap 12 fitted over the tube 18. It can be seen that the filler tube 18 and reservoir 17 effectively locates the cap 12 in position over the open end of the cup 11 so that these can then be sealed together by glazing, without requiring the cup to be machined.

The filling tube 18 may extend above the top face of the cell to the point 23 illustrated in the drawing. To fill the cell, molten sodium can then be introduced into the reservoir 17 through the filling tube 18 and in operation of the cell is drawn by capillary attraction through a small aperture 24 at the base of the reservoir to fill the narrow space or active region between the reservoir and the electrolyte cup. However, before the surfaces of the electrolyte and the reservoir defining the active region have first been wetted by molten sodium, capillary action will be insufficient to drawn the sodium through the aperture 24. Accordingly, a gas-tight connection is made to the filling tube 18 and an overpressure is produced inside the reservoir to force sodium into the active region to fully wet the surfaces. The overpressure may be provided by evacuating the anode region before introducing the alkali metal and then repressurising the interior of the reservoir. After this and when a full load of sodium has been introduced into the reservoir 17, the reservoir, and the anode chamber itself, can be closed by pinching off the top part of the filling tube 18 as illustrated at 25. The upper end of the filling tube 18 is then discarded.

As can be appreciated, the metal reservoir 17 within the anode chamber of the cell provides three functions. Being made of metal and being welded to the filling tube 18 which in turn extends out through the top of the cell, the reservoir provides a current collector for the anode of the cell. Further, the close spacing between the reservoir 17 and the inner face of the electrolyte cup 11 in association with the small aperture 24 at the foot of the reservoir, ensures that substantially all the inner surface of the electrolyte is in use continuously wetted by molten sodium even as the level of sodium within the reservoir itself declines as the cell is discharged.

Importantly, however, the reservoir 17 with the small aperture 24 also restricts the amount of sodium which is directly accessible to any cathodic reactant which may leak through the electrolyte cup 11 in the event of failure thereof. Only the small volume of sodium making up the film surrounding the reservoir 17 is immediately accessible to react with incoming sulphur/sodium polysulphides, thereby substantially limiting any temperature excursion which might arise on failure of the electrolyte. Subsequently, fresh sodium to react with incoming sulphur/sodium polysulphide material may be provided only at the rate determined by flow through the small aperture 24 which is set to limit the flow to that required for the maximum rate of discharge of the cell in normal operation.

Accordingly, this novel structure described above provides greatly increased safety for the cell in the event of failure of the electrolyte whilst facillitating assembly of the cell and particularly filling and priming with sodium. The anodic and cathodic materials are kept substantially apart so as to prevent an undesirable rise in temperature which could rupture the outer cell container 10.

The single bottle illustrated in FIG. 1 may be fabricated from two open cups turned mouth to mouth and welded together with an interposed perforated disc. The disc forms a central horizontal baffle in the bottle forming the reservoir and the perforations through the disc would be located so that molten sodium could pass through whatever the orientation of the cell.

With the above construction, the reservoir bottle can be formed using very thin mild steel. The interposed disc not only assists in the operation of welding the two open cups together to form the bottle, but substantially strengthens the resulting bottle.

Figure 2:
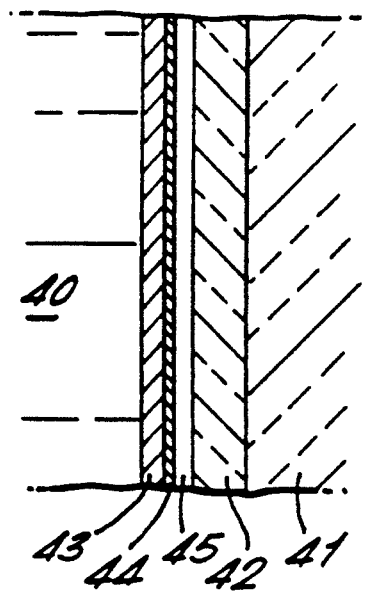
FIGS. 2 and 3 are detailed cross-sectional view of parts of the cells.
Figure 3:
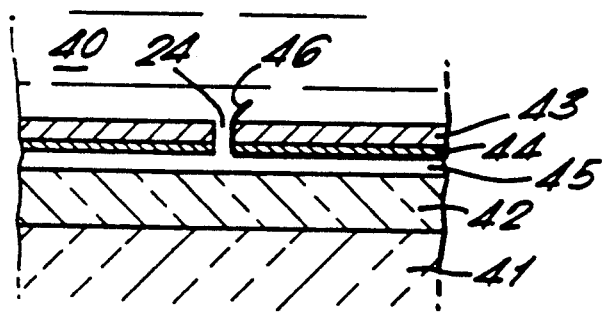

Referring now to FIGS. 2 and 3, these illustrate detailed improvements in the construction of cells embodying the present invention.

FIG. 2 is a detailed cross-section illustrating the layer structure between the inside of the sodium reservoir containing liquid sodium 40, and the cathode region 41 containing sulphur impregnated carbon felt and which is on the outside of the wall 42 of the solid electrolyte cup. The wall of the reservoir is shown at 43 and preferably comprises mild steel with a thin sheet of graphite foil 44 bonded to its exterior surface. The graphite foil provides protection to the mild steel wall of the reservoir against corrosive attack by any sodium polysulphides appearing in the space between the reservoir and the electrolyte in the event of failure of the electrolyte.

Conveniently, the narrow space 45 between the wall 43 of the reservoir and the solid electrolyte 42 is packed with alumina fibre. This fibre packing provides an additional wicking effect to ensure sodium from the reservoir is fully distributed to wet the entire inner cylindrical surface of the electrolyte cup, and additionally operates as a getter to mop up undesirable impurities in the sodium.

Figure 4:
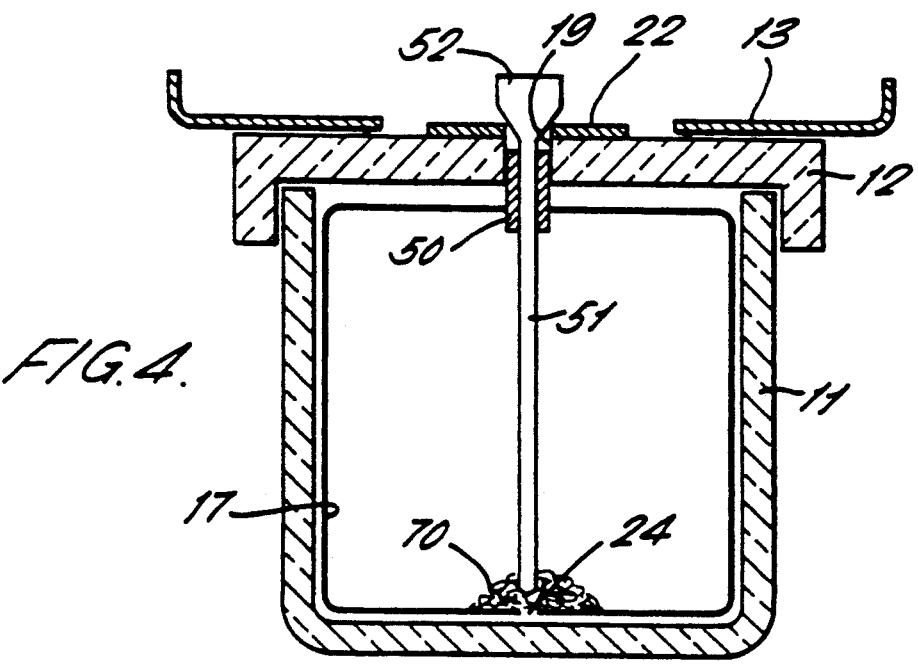
FIG. 4 is a cross-sectional view of another embodiment of the invention.

The structure immediately around the aperture in the base of the reservoir can forming the flow means is illustrated in detail in FIG. 4. The components corresponding to those shown in FIG. 3 are given the same reference numerals. A tag 46 made of nickel is secured in the aperture 24 as shown. Since nickel is very easily wetted by molten sodium, the nickel tag assists initial passage of molten sodium through the aperture.

A further embodiment of the invention is illustrated in FIG. 4 in which corresponding parts are again given the same reference numerals as in FIG. 1. In the FIG. 4 embodiment, a filling tube 50 is provided which extends only part way into aperture 19 through the alpha alumina cap 12. The filling tube 50 is firmly sealed to the reservoir 17 and is also sealed inside the aperture 19, so that gas tight communication can be provided with the interior of the reservoir 17 by making a gas tight connection to the outerside of the aperture 19.

Because the tube 50 does not extend right through the aperture 19, special provision must be made for collecting current from the anode material. A current collector pin 51 is located extending down through the aperture 19 and the filling tube 50 so as to make contact with any molten sodium remaining in the reservoir 17. The current collector pin 51 is welded around its head 52 to the washer 22 so as to seal off the anode compartment of the cell. A metallic sponge 70, preferably of steel, is provided at the base of the reservoir and contacts the end of the current collector pin 51 to ensure good electrical contact even at low sodium levels.

Figure 5:
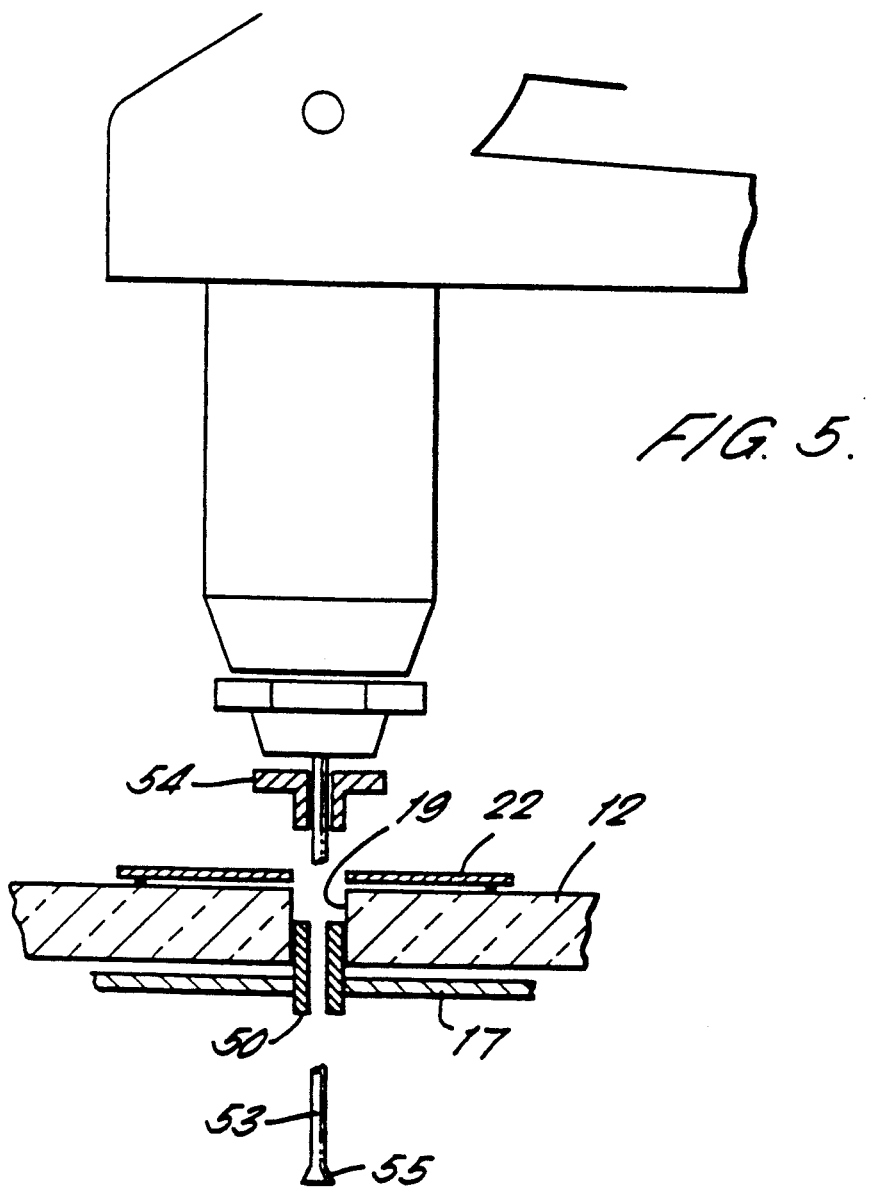
FIG. 5 illustrates a method of assembling part of the cell illustrated in FIG. 4.

In order to assemble the embodiment illustrated in FIG. 4, a mandrel riveting technique can be used as illustrated in FIG. 5. The reservoir can 17 is first located inside the electrolyte cup 11 and then the alpha alumina lid 12 is sealed to close off the cup. The reservoir can 17 is made with an aperture at its upper end aligned and sized to correspond with the aperture 9 in the lid 12. A mandrel riveting tool is assembled with a sleeve or ferrule of deformable metal which will form the filling tube 50 mounted on the mandrel 53 and the mandrel and sleeve is then inserted through the aperture 19 so as to locate the sleeve as shown in FIG. 5 extending through the aperture in the can 17 and part way up through the aperture 19 in the ceramic lid 12. A spacer 54 is conveniently positioned on the riveting tool so as to ensure correct positioning of the sleeve 50. The tool is then operated to withdraw the mandrel 53 back through the sleeve 50 with the sleeve 50 abutting the spacer 54 and thereby located correctly. As the head 55 of the mandrel 53 is drawn through the sleeve 50, the sleeve is expanded outwards to provide a pressure seal in the aperture in the can 17 and also to the interior walls of the aperture 19 in the lid 12.

Figure 6:
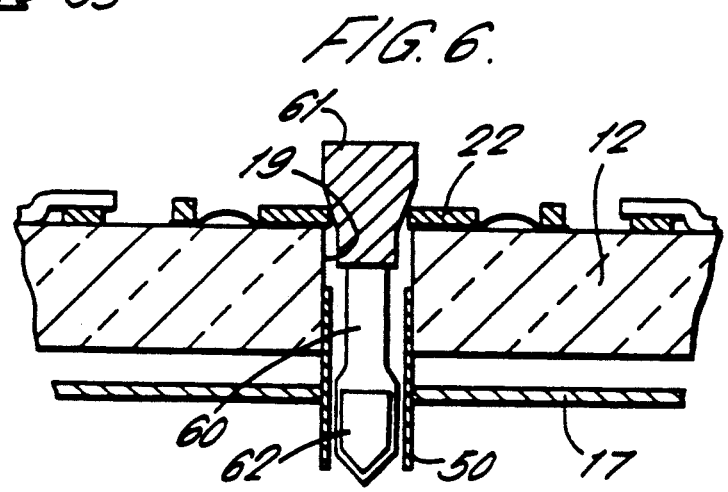
FIG. 6 is a detailed cross-section view of a modification to the cell illustrated in FIG. 4.

FIG. 6 illustrates a modification of the cell shown in FIG. 4 and is a detailed cross sectional view of the area of the cell around the filling tube 50. Instead of providing the current collecting pin 51 extending right down into the reservoir to make contact with molten sodium therein, a connecting stud 60 is employed having a head 61 formed to bear against the washer 22 to which it is welded to seal off the anode region of the cell. The stud extends into the anode region only as far as the open end of the filling tube 50 into the interior of the reservoir 17. The inner end of the stud 60 is hollow to form a capsule 62 filled with a material which expands on heating, typically gas or liquid. When the stud 60 is initially located into the aperture 19, the capsule 62 is not expanded so that the stud slides easily into the filling tube 50 as shown. On heating of the cell, and the stud 60, up to an elevated temperature, e.g. the operating temperature of the cell, the capsule 62 expands due to the expansion of the material contained therein, and makes a solid electrical contact with the interior of the filling tube 50. As a result, the stud 60 provides electrical connection to the reservoir can 17 thereby obviating the need for any further current collector in the anode region.

We claim:

1. An alkali metal cell comprising;
   an outer container;
   a solid electrolyte cup within the container dividing the container into an anode region inside the cup and a cathode region outside the cup;
   an alkali metal reservoir fitting closely inside the electrolyte cup to provide an active region, so as to limit the amount of alkali metal directly exposed to the inner surface of the electrolyte cup, the reservoir comprising flow means for allowing alkali metal to flow from within the reservoir to the active region;
   an electrically insulating ceramic closure sealed to the electrolyte cup and having an aperture therein, a wall of the reservoir extending under the ceramic closure having an opening therein aligned with said aperture; and
   a deformable metal ferrule rivet for providing a gas tight connection between the reservoir and the ceramic closure to enable gas tight communication with the interior of the reservoir through the aperture in the closure, said rivet extending from said opening at least into said aperture and being effective as a filling tube during construction of the cell, said rivet being adapted to allow, during construction, the application of an overpressure to the interior of the reservoir.

2. An alkali metal cell as claimed in claim 1, wherein the rivet extends only part way through the aperture and is sealed therein.

3. An alkali metal cell as claimed in claim 2, and including an anode current collector pin extending through the aperture and the rivet to contact molten alkali metal contained in the reservoir.

4. An alkali metal cell as claimed in claim 1, wherein both the rivet and the reservoir are electrically conducting and electrically interconnected and including an electrically conductive connection stud extending through the aperture and electrically connected to the rivet.

5. An alkali metal cell as claimed in claim 4, wherein the stud has an inner end incorporating a capsule containing a heat expansible material to expand the inner end to form a pressure contact with the rivet.

6. An alkali metal cell as claimed in claim 1 wherein the reservoir is made of mild steel and sheathed on its exterior face with graphite foil.

7. An alkali metal cell as claimed in claim 1 wherein the active region between the reservoir and the electrolyte cup contains alumina fibre material providing a wick to assist capillary action.

8. An alkali metal cell as claimed in claim 3 having a metallic sponge at the bottom of the reservoir adapted to ensure the provision of anode current at low sodium levels.

* * * * *